No. 817,999. PATENTED APR. 17, 1906.
O. STARK.
LAND SCRAPER.
APPLICATION FILED DEC. 7, 1905.
2 SHEETS—SHEET 1.
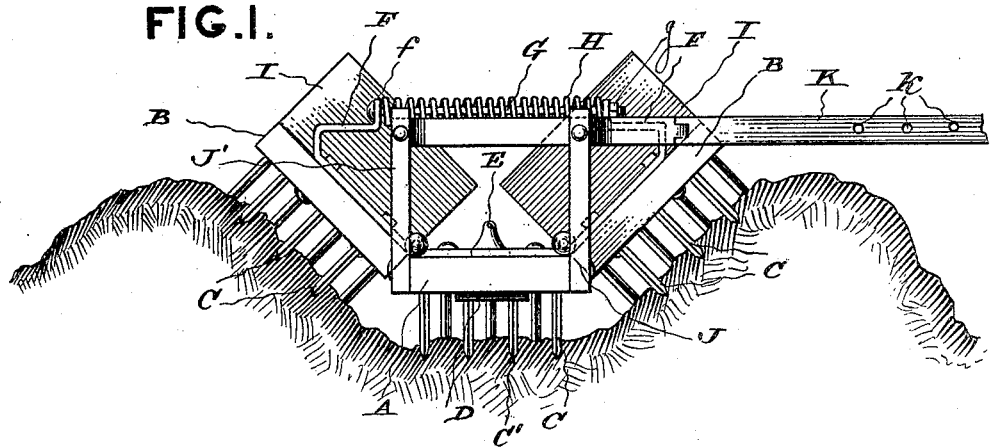
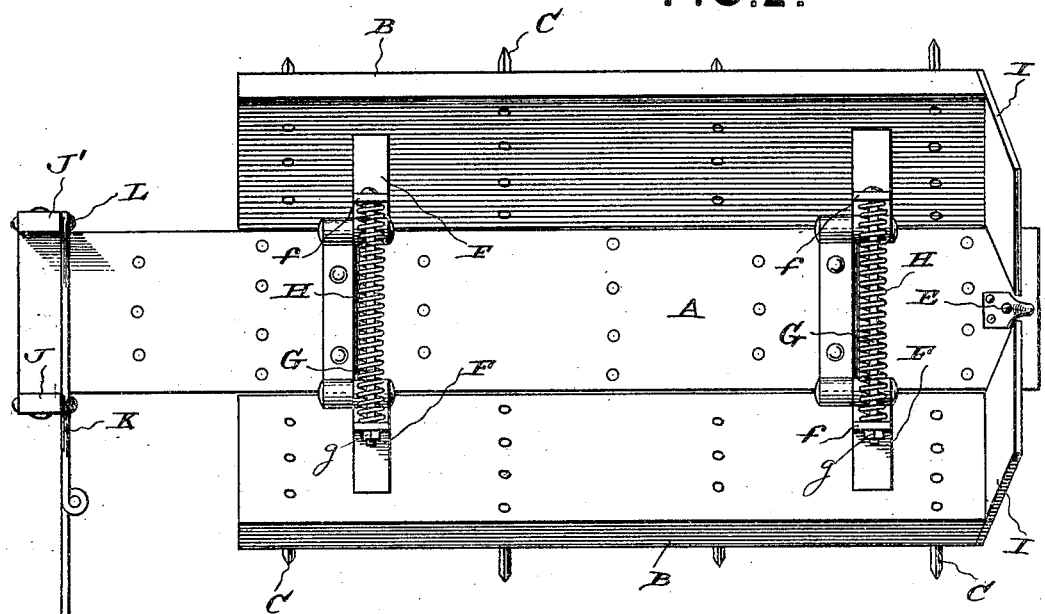
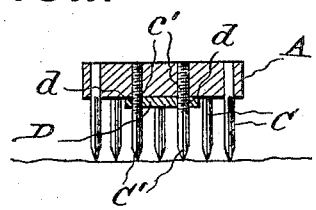
Witnesses,
Francis L. Alden
Jas. H. Blackwood
Oly Stark,
Inventor.
By James H. Polk
Attorney.

No. 817,999. PATENTED APR. 17, 1906.
O. STARK.
LAND SCRAPER.
APPLICATION FILED DEC. 7, 1905.

2 SHEETS—SHEET 2.

Witnesses,
Francis E. Alden
Jas. N. Blackwood

Oly Stark,
Inventor.
By James K. Polk
Attorney.

UNITED STATES PATENT OFFICE.

OLY STARK, OF HARDIN, MISSOURI.

LAND-SCRAPER.

No. 817,999. Specification of Letters Patent. Patented April 17, 1906.

Application filed December 7, 1905. Serial No. 290,801.

*To all whom it may concern:*

Be it known that I, OLY STARK, a citizen of the United States, and a resident of Hardin, in the county of Ray and State of Missouri, have invented certain new and useful Improvements in Land-Scrapers, of which the following is a specification.

My invention relates to devices for scraping land to remove weeds and loosen the surface so as to assist growing plants in forcing their way through the ground.

My invention is especially adapted to the cultivation of what is known as "listed" land, in which deep and wide furrows are made with a shovel-plow and the corn or other seed is planted in the bottom of the furrow. It often happens that before the plant appears above the ground-surface a heavy rain will occur and pack the earth over the seed into a muck, which dries into a hard crust, through which the plant would have difficulty in forcing its way, and at the same time grass and weeds will spring up which will interfere with the plants. My device is designed to loosen this crust, break up earth-clods, and uproot the grass and weeds, which in the early stages of their growth are easily removed.

My invention will be described in detail hereinafter and illustrated in the accompanying drawings, in which—

Figure 3:
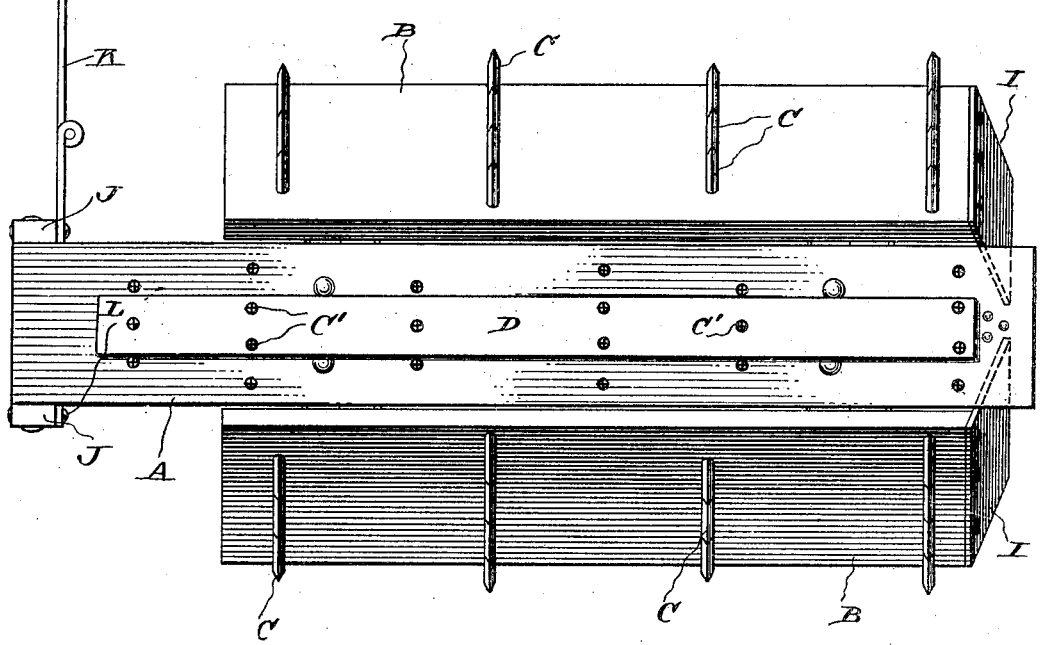

Figure 1 is a view showing an end view of my invention in place in a land-furrow; Fig. 2, a top plan view of the invention; Fig. 3, a view of the bottom of the device; Fig. 4, a cross-section of the middle plank, and Fig. 5 a view showing the manner of arranging the scraper in gangs for working two or more rows at a time.

In the drawings similar reference characters indicate corresponding parts throughout the several views.

My invention consists, essentially, of three planks secured together by hinges and of which the central plank A is longer than the side planks B. In the bottom of said planks are secured teeth C, being set, as shown, in a staggered manner, so as to thoroughly scrape the soil when in operation, as will be described hereinafter. In the center of the bottom of plank A is secured a metal plate D, having threaded sockets $d$ therein, in which the teeth C' in the center of said plank A are secured, being provided with threaded shanks $c'$ for this purpose.

E represents a hook on the front end of the plank A, to which is secured the draft-animal. The side planks B are provided with uprights F, having eyes in their upper ends $f$, in which are secured cross-rods G, on which are mounted expansible coil-springs H, the purpose of this construction being to permit automatic adjustment of the sides to the varying widths of the furrows, the amount of the play of the two planks B B and the tension of the springs H being regulated by means of a nut $g$ on the threaded end of rod G.

Figure 5:
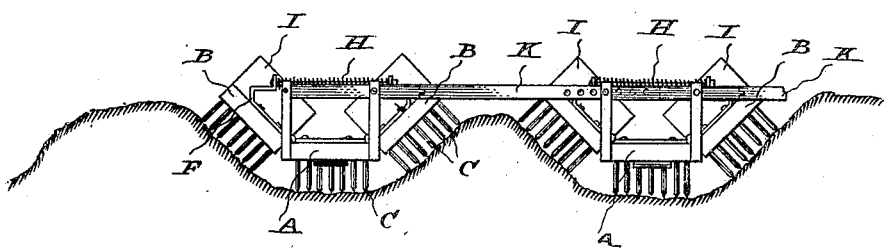

I represents shields secured to the front ends of the planks B B to prevent the earth, weeds, &c., from falling back on the device. At the rear end of the plank A are secured uprights J J', and K represents a hinged rod secured to upright J and adapted to be extended and secured to upright J' of the adjacent scraper by means of a bolt L when joining them in gangs, as shown in Fig. 5, or if the device is to be used singly it will be understood that the rod may be folded on itself and secured to the upright J' on the same device in any suitable manner. The free end of the rod K is provided with a series of holes $k$ to permit the adjustment of the several component scrapers in the gang to the width of the furrow to be worked.

In operation my device is drawn through the furrow, the teeth carried by plank A scraping the bottom thereof, while the teeth carried by planks B B scrape its sides and will successfully loosen the top soil, remove weeds and grass therefrom, and at the same time break up earth-clods that may be in the furrow. In case the device should be used after the plants have begun to show above the surface the teeth C' are removed by unscrewing them from the plate D, and all danger of interfering with the young plants will be avoided, while at the same time the earth around the said plants will be loosened and grass and weeds exterminated.

Having thus described my invention, what I claim is—

1. In a cultivator, three planks pivotally secured together, cultivating devices secured thereto, and means to yieldingly regulate the position of the two outer planks relative to the middle plank, substantially as shown and described.

2. In a cultivator, three planks pivotally secured together, cultivating devices secured thereto, and spring-actuated means to yieldingly regulate the position of the two outer planks relative to the middle plank, substantially as shown and described.

3. In a cultivator, three planks secured pivotally together, cultivating devices secured thereto, perforated uprights secured to the outside planks, rods slidably mounted in the holes in said uprights, and expansible coil-springs mounted on said rods and bearing against said uprights, substantially as shown and described.

4. In a cultivator, three planks pivotally secured together, teeth secured to the bottoms of said planks, and spring-actuated means to regulate the position of said planks relative to one another, substantially as shown and described.

5. In a cultivator, three planks pivotally secured together, teeth secured to the bottoms of said planks, perforated uprights secured to the outside planks, rods slidably mounted in the holes in said uprights, and expansible coil-springs mounted on said rods and bearing against said uprights, substantially as shown and described.

6. In a cultivator, three planks pivotally secured together, the middle of said planks provided with a plate having threaded sockets therein, teeth secured in said planks and in said threaded sockets, and means to yieldingly regulate the position of the two outer planks relative to the middle plank, substantially as shown and described.

7. In a cultivator, three planks pivotally secured together, the middle of said planks provided with a plate having threaded sockets therein, teeth secured in said planks and in said threaded sockets, and spring-actuated means to regulate the position of said planks relative to one another, substantially as shown and described.

8. In a cultivator, three planks pivotally secured together, the middle of said planks provided with a plate having threaded sockets therein, teeth secured in said planks and in said threaded sockets, perforated uprights secured to the outside planks, rods slidably mounted in the holes in said uprights, and expansible coil-springs mounted on said rods and bearing against said uprights, substantially as shown and described.

9. In a cultivating device consisting of a gang of individual cultivators, uprights secured to each individual cultivator, a hinged rod secured to one upright, and adapted to be secured to an upright on the adjacent individual device, the other upright being adapted to be secured to the rod on the neighboring cultivator, said hinged rod being adapted to fold on itself and to be secured to the upright farthest from the hinge therein when the gang is separated into the individual elements, substantially as shown and described.

In testimony whereof I have hereunto set my hand in presence of two subscribing witnesses.

OLY STARK.

In presence of—
  G. P. LONG,
  A. T. BROUGHTON.